United States Patent
Rajaram

(10) Patent No.: US 9,697,437 B2
(45) Date of Patent: Jul. 4, 2017

(54) LOGO DETECTION

(71) Applicant: Facebook, Inc., Menlo Park, CA (US)

(72) Inventor: Giridhar Rajaram, Cupertino, CA (US)

(73) Assignee: Facebook, Inc., Menlo Park, CA (US)

( * ) Notice: Subject to any disclaimer, the term of this patent is extended or adjusted under 35 U.S.C. 154(b) by 5 days.

(21) Appl. No.: 14/715,101

(22) Filed: May 18, 2015

(65) Prior Publication Data

US 2016/0342859 A1    Nov. 24, 2016

(51) Int. Cl.
| | |
|---|---|
| *G06K 9/62* | (2006.01) |
| *G06K 9/46* | (2006.01) |
| *G06K 9/80* | (2006.01) |
| *G06T 7/11* | (2017.01) |
| *G06T 7/162* | (2017.01) |

(52) U.S. Cl.
CPC ......... *G06K 9/6202* (2013.01); *G06K 9/4647* (2013.01); *G06K 9/6215* (2013.01); *G06K 9/6267* (2013.01); *G06K 9/80* (2013.01); *G06T 7/11* (2017.01); *G06T 7/162* (2017.01)

(58) Field of Classification Search
None
See application file for complete search history.

(56) References Cited

U.S. PATENT DOCUMENTS

| | | | |
|---|---|---|---|
| 2003/0091237 A1* | 5/2003 | Cohen-Solal | G06K 9/3266 382/204 |
| 2012/0134576 A1* | 5/2012 | Sharma | G06K 9/4604 382/155 |
| 2014/0133763 A1* | 5/2014 | van Zwol | G06K 9/6202 382/218 |
| 2014/0139660 A1* | 5/2014 | Zhu | G06K 9/00369 348/143 |
| 2014/0241629 A1* | 8/2014 | Lerios | G06T 9/00 382/166 |

* cited by examiner

*Primary Examiner* — Bhavesh Mehta
*Assistant Examiner* — Narek Zohrabyan
(74) *Attorney, Agent, or Firm* — Perkins Coie LLP

(57) ABSTRACT

Identifying whether an image includes a search image can be accomplished using region analysis and/or parts model analysis. Region analysis can include dividing a received image into regions and analyzing each region by: enlarging the region, applying a gradient histogram transformation to the enlarged region, and comparing the transformed region, at various angles, to a set of search patterns. Parts model analysis can include identifying key features of an image such as prominent lines or areas, objects or object edges, consecutive colors; generating one or more parts models from the key features by representing the key features as geometric objects; and comparing each parts model, at various angles, to a set of search patterns. The comparison employed in region analysis or parts model analysis can employ classifiers trained on the search images.

22 Claims, 7 Drawing Sheets

LOGO DETECTION

BACKGROUND

The amount of digital content users create and view is growing at an exponential rate. It is common for web providers to operate databases with petabytes of data, while leading content providers are already looking toward technology to handle exabyte implementations. One social networking website, for example, has attracted over a billion users including over 30 million businesses and 1.5 million advertisers. In addition, 890 million of these users visit the website each day for an average of 40 minutes per day, viewing user posts and other content such as advertisements, promotions, events, news stories, etc. Much of this viewed content includes images. Users of this website, for example, have posted over 250 billion photos, with another 350 million photos being posted each day.

Sometimes these images include proprietary content such as items subject to trademark, copyright, or patent protection and for which the content poster does not have the appropriate rights to use the content. In addition, these images may contain other information which can be valuable to classify such as who appears in the images, what letters are being shown, whether the content includes objectionable portions, etc. However, due to the sheer volume of images, it is infeasible for each image to be analyzed by a human.

Several computational approaches have been used attempting to match images to known images or to identify image features. For example, neural networks have been used to analyze images and classify them for particular features. As another example, image comparison has been attempted by applying warp transformations to images as a pre-processing step to matching. However, these methods are prone to accuracy errors.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
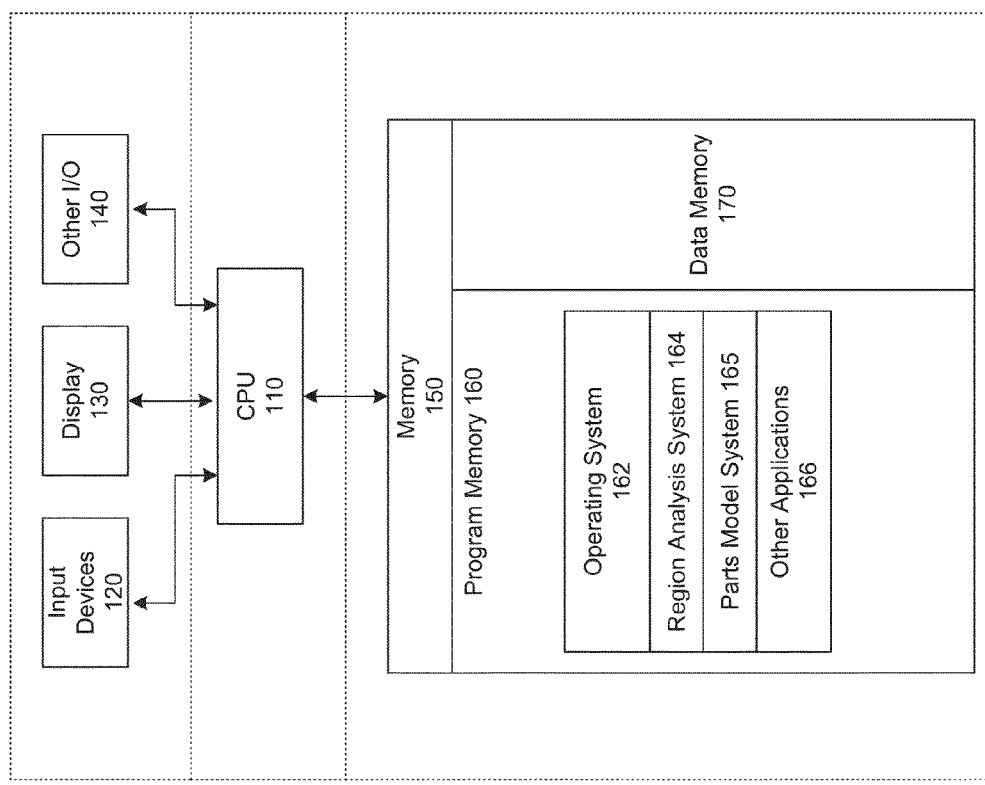
FIG. 1 is a block diagram illustrating an overview of devices on which some implementations of the disclosed technology can operate.

Various ways of matching portions of images to known images or patterns is disclosed. In some implementations, referred to herein as a "region analysis" approach, the matching is performed by dividing an image into regions, enlarging each region, applying a histogram of gradients transformation to the enlarged region, and comparing the transformed region to one or more images for which a search is being run. This comparison can be done by applying various distortions and modifications to the region, such as using different rotations a warping algorithm. In some implementations, referred to herein as a "parts model" approach, the matching is performed by identifying features of an image (also referred to herein as "key features"), using the key features to build one or more parts models of the image, and comparing the parts models to one or more images for which a search is being run. Key features are portions of an image that are identified as suitable for analysis.

As used herein, a "search image" or "search images" refers to one or more images for which a search is made. For example, a search image can include a set of one or more logos that a system is being configured to look for in a number of advertisement images. As used herein, a "key feature" can be any identified features of an image such as identified objects, areas or points with a particular color or brightness, identified edges, color or pixel patterns, etc.

As an example of a system implementing the region analysis approach, a social media provider can identify a search image as a logo that an advertiser may have incorporated into its advertisements without permission. The system can build a classifier, such as a support vector machine (SVM), for the search image using multiple instances of image portions taken from advertisements. Each portion can be labeled with whether or not it includes the search image. The system can enlarge each portion to 80×80 pixels and transform each enlarged portion using a histogram of gradients transformation. The system can then train the SVM using the transformed and enlarged labeled image portions. When the social media provider receives a new advertisement with an image, the system can divide the received image into regions by setting region edges where the image has a transition between intensities. Sometimes, the same region edge can be used multiple times, e.g. to create overlapping regions. The system can then enlarge each region to be at least 80×80 pixels. The system can then transform each enlarged region using a histogram of gradients transformation. Finally, the system can determine whether or not the received image contains the search image by classifying each region using the trained SVM. If the SVM identifies any region as including the search image, the received image is classified as including the search image.

As an example of a system implementing the parts model approach, a social media provider can identify a search image as a trademarked image which advertisers often incorporate into their advertisements without permission. The system can build a classifier, such as a neural network, for the search image using multiple images taken from advertisements. Each advertisement image will be labeled with whether or not it includes the search image. The system can train the neural network by converting each advertisement image into a parts model and using the labeled parts models as training data. A "parts model," as used herein, is a simplified version of an original image including only identified key features of an image and, in some instance, connections between the key features or geometric representations of the key features. When the social media provider receives a new image advertisement, the system can generate a parts model for the received image and run the parts model for the received image through the trained neural network to determine whether or not the received image includes the search image. The key features identified for a parts models can include prominent areas, lines identified through edge or curve analysis, object or text identification, synthetic image portion analysis (see, e.g. commonly assigned U.S. patent application Ser. No. 13/781,632, which is herein incorporated by reference), etc.

In some implementations, both the region analysis approach and the parts model approach can be used. In various implementations, these approaches can be applied in sequence or in parallel. In some implementations, these approaches are incorporated in a system to classify whether an image should be allowed, dis-allowed, or marked as needing further review, such as by a more powerful classification system or by a human reviewer. In some implementations, classifications indicating that the image is disallowed or needs further review are coupled with a reason, such as an indication that the image may include a specified logo, match a particular person or object, or include objectionable content. In some implementations, the classification can be a score or can include a confidence level.

Several implementations of the described technology are discussed below in more detail in reference to the figures. Turning now to the figures, FIG. 1 is a block diagram illustrating an overview of devices 100 on which some implementations of the disclosed technology may operate. The devices can comprise hardware components of a device 100 that locates search images using one or both of a region analysis or parts model. Device 100 can include one or more input devices 120 that provide input to the CPU (processor) 110, notifying it of actions. The actions are typically mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some examples, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 has access to a memory 150. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 includes program memory 160 that stores programs and software, such as an operating system 162, Region Analysis System 164, Parts Model System 165, and any other application programs 166. Memory 150 also includes data memory 170 that can include labeled images, parts models, histograms of gradients, classifiers, region templates, search images, configuration data, settings, and user options or preferences which can be provided to the program memory 160 or any element of the device 100.

The disclosed technology is operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, tablet devices, multiprocessor systems, microprocessor-based systems, set-top boxes, programmable consumer electronics, network PCs, minicomputers, mainframe computers, distributed computing environments that include any of the above systems or devices, and the like.

Figure 2:
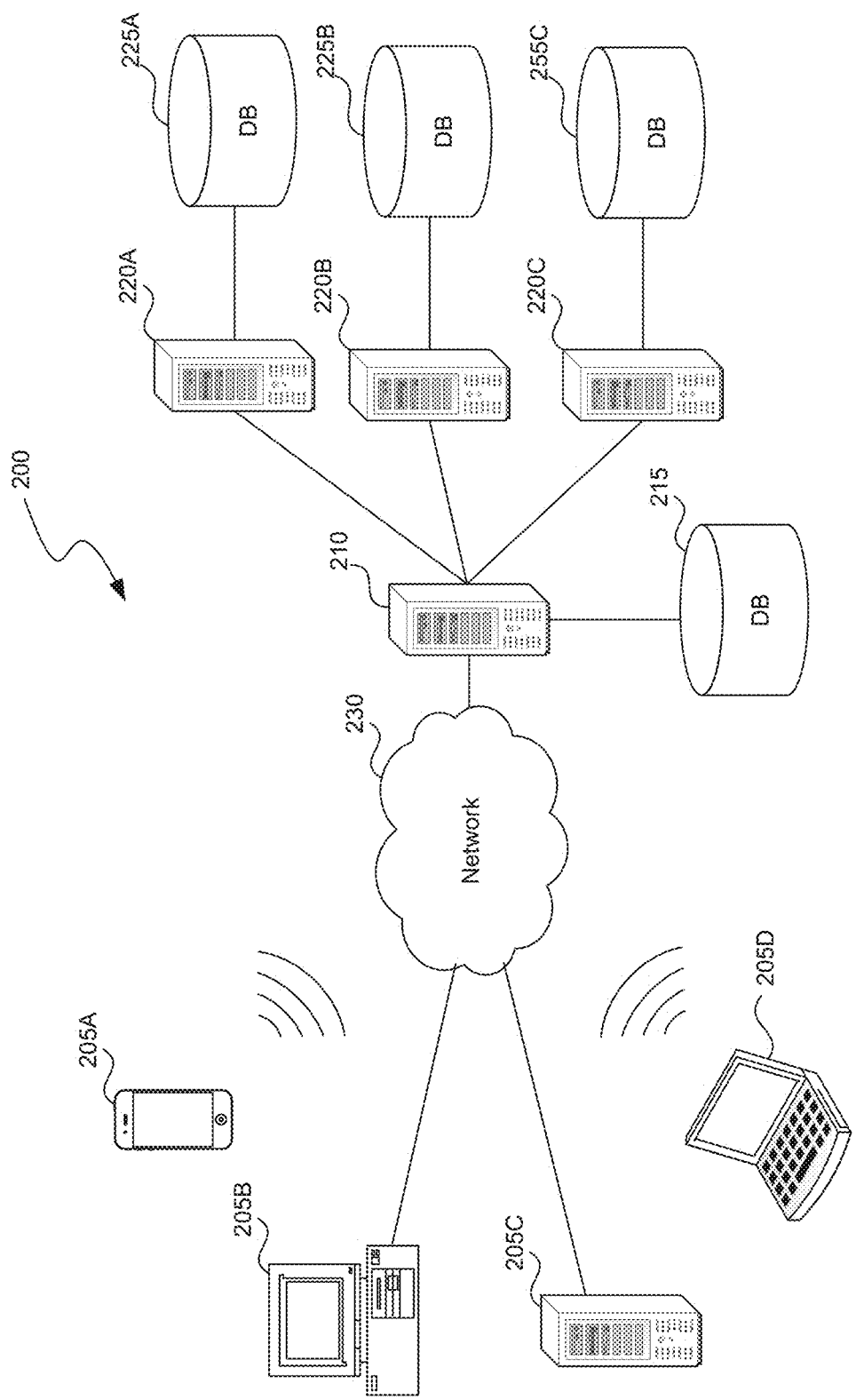
FIG. 2 is a block diagram illustrating an overview of an environment in which some implementations of the disclosed technology can operate.

FIG. 2 is a block diagram illustrating an overview of an environment 200 in which some implementations of the disclosed technology may operate. Environment 200 can include one or more client computing devices 205A-D, examples of which may include device 100. Client computing devices 205 can operate in a networked environment using logical connections 210 through network 230 to one or more remote computers such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 may correspond to a group of servers, and each of these servers can share a database or can have their own database. Databases 215 and 225 can warehouse (e.g. store) information such as labeled images, parts models, histograms of gradients, classifiers, region templates, search images, and classified images or image parts. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. The client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
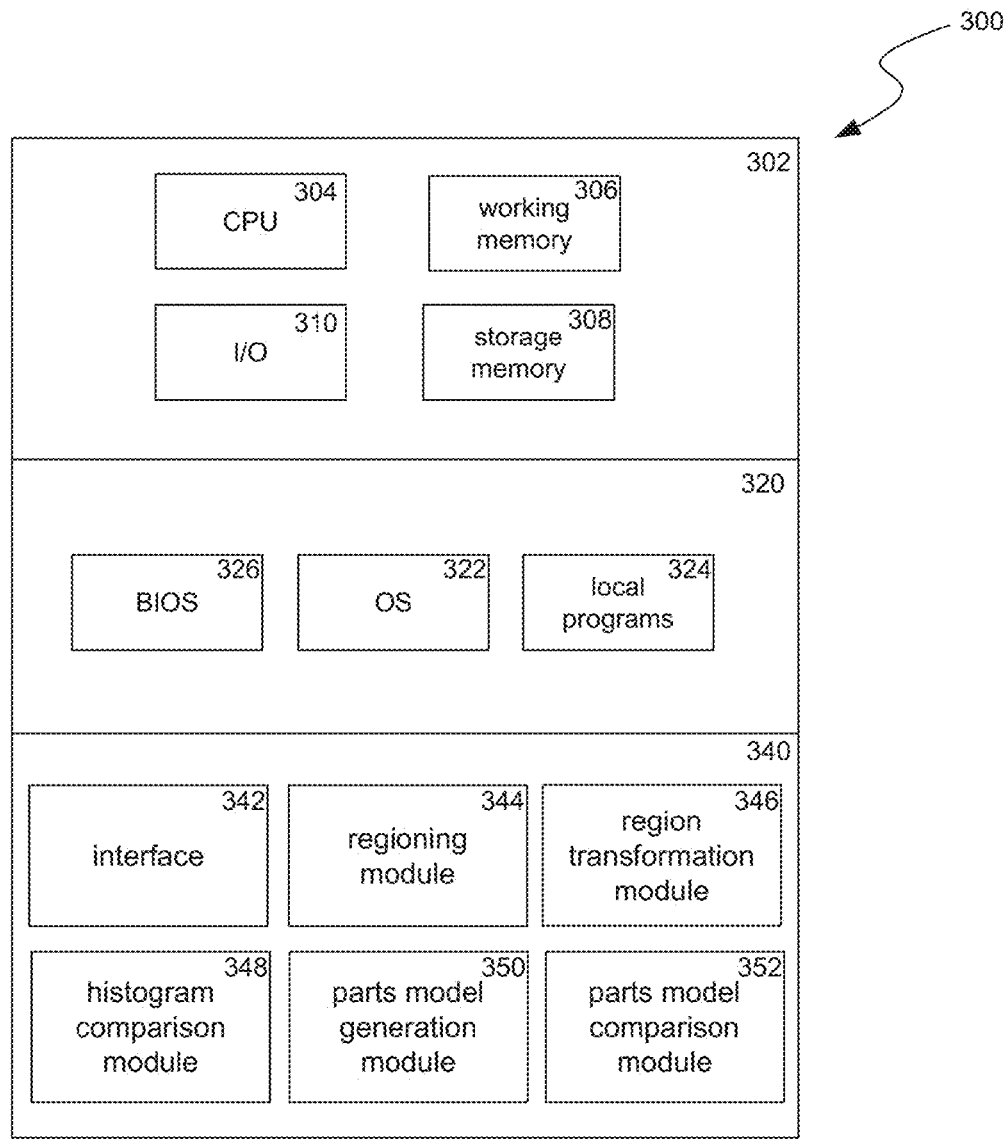
FIG. 3 is a block diagram illustrating components which, in some implementations, can be used in a system employing the disclosed technology.

FIG. 3 is a block diagram illustrating components 300 which, in some implementations, can be used in a system implementing the disclosed technology. The components 300 include hardware 302, general software 320, and specialized components 340. As discussed above, a system implementing the disclosed technology can use various hardware including central processing units 304, working memory 306, storage memory 308, and input and output devices 310. Components 300 can be implemented in a client computing device such as client computing devices 205 or on a server computing device, such as server computing device 210 or 220.

General software 320 can include various applications including an operating system 322, local programs 324, and a BIOS 326. Specialized components 340 can be subcomponents of a general software application 320, such as a local program 324. Specialized components 340 can include regioning module 344, region transformation module 346, histogram comparison module 348, parts model generation module 350, parts model comparison module 352, and components which can be used for controlling and receiving data from the specialized components, such as interface 342, also referred to herein as a programmatic interface. Some implementations that only implement the region analysis approach do not include parts model generation module 350 and parts model comparison module 352. Some implementations that only implement the parts model approach do not include regioning module 344, region transformation module 346, comparison module 348, and histogram comparison module 348. In some implementations, components 300 can be distributed across multiple computing systems or can include an interface to a server-based application.

Regioning module 344 can be configured to receive an image through interface 342 and divide the received image into one or more regions. In various implementations, dividing the image into regions can be based on a preset region size, object identification, text identification, edge analysis, curve analysis, areas of color change, areas of intensity change, etc. In some implementations, any of the factors for determining an image region can be set according to a search image. For example, a size for regions can be set as a multiple of the search image size or text can be searched for using text identified in the search image. In some implementations, regions can be determined based on multiple factors such as some regions being based on object identification and others being based on edge detection. In some implementations, regions can overlap such as where one region is defined by an identified object where another region is identified by changes in color intensity where the identified object is inside the region defined by the intensity variations.

Region transformation module 346 can be configured to receive one or more image regions from regioning module 344 and can apply a transformation algorithm to the regions. In some implementations, the transformation algorithm includes enlarging a region and computing a histogram of gradients for the enlarged region. In some implementations, computing a histogram of gradients includes: (1) computing a gradient analysis for the region, which can include applying a derivative mask in one or more directions and can employ filtering image colors or intensity data; (2) for each of multiple subsections of the region (which in some implementations are all equal sized), each pixel in that subsection can provide a weighted value for an orientation histogram channel based on the gradient computation for that pixel, where the value weights are based on the gradient magnitude; (3) locally normalizing gradient strengths by grouping the subsections together into connected blocks, which can be represented as a vector (in some implementations, these blocks may overlap, i.e. the same subsection can be included in multiple blocks); and (4) performing normalization across the blocks.

In some implementations, the region transformation module 346 can produce multiple transformed version of the enlarged region, each represented as a histograms of gradients. This can be accomplished by applying further transformations such as rotation, warping, or resizing to the region. In various implementations, enlarging a region can include first splitting regions that are already larger than the enlargement size, enlarging a region to at least 80×80 pixels, or maintaining region height/length ratios.

Histogram comparison module 348 can be configured to receive one or more transformed regions from region transformation module 346 and compare the transformed region to a search image to determine whether the received region includes the search image. In some implementations, this comparison is done by a classifier trained to identify the search image. In various implementations, the classifier can be any of a neural network, deep neural network, support vector machine, decision tree, Parzen window, Baye, or other type of classifier. Training data for the classifier can include various images each classified with whether or not that image includes the search image. In some implementations, the training data can be histograms of gradients of images previously classified with whether or not the images include the search image.

Parts model generation module 350 can be configured to receive an image through interface 342 and generate a parts model. This can be accomplished by removing all but identified key features of the received image or representing only key features of an image as basic geometric shapes. Parts model generation module 350 can identify key features using various techniques such as object identification; edge or curve analysis; change in color, hue, or intensity; identifying prominent areas; text identification; or synthetic image portion analysis. In some implementations, one or more parts models can be obtained by adding connections between one or more of the various identified key features. In some implementations, these connections can be based on connecting key features that are within a threshold distance of each other. In some implementations, these connections can be based on best fit to lines of a template created from the search image. In some implementations, multiple parts models can be created from a single received image.

Parts model comparison module 352 can be configured to receive one or more parts models generated by parts model generation module 350 and compare each parts model to a search image to determine whether the received parts model represents the search image. In some implementations, this comparison is done by a classifier trained to identify the search image. In various implementations, the classifier can be any of a neural network, deep neural network, support vector machine, decision tree, Parzen window, Baye, or other type of classifier. Training data for the classifier can include various images each classified with whether or not that image includes the search image. In some implementations, the training data can be parts models for images previously classified with whether or not the images includes the search image.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc.

Figure 4A:
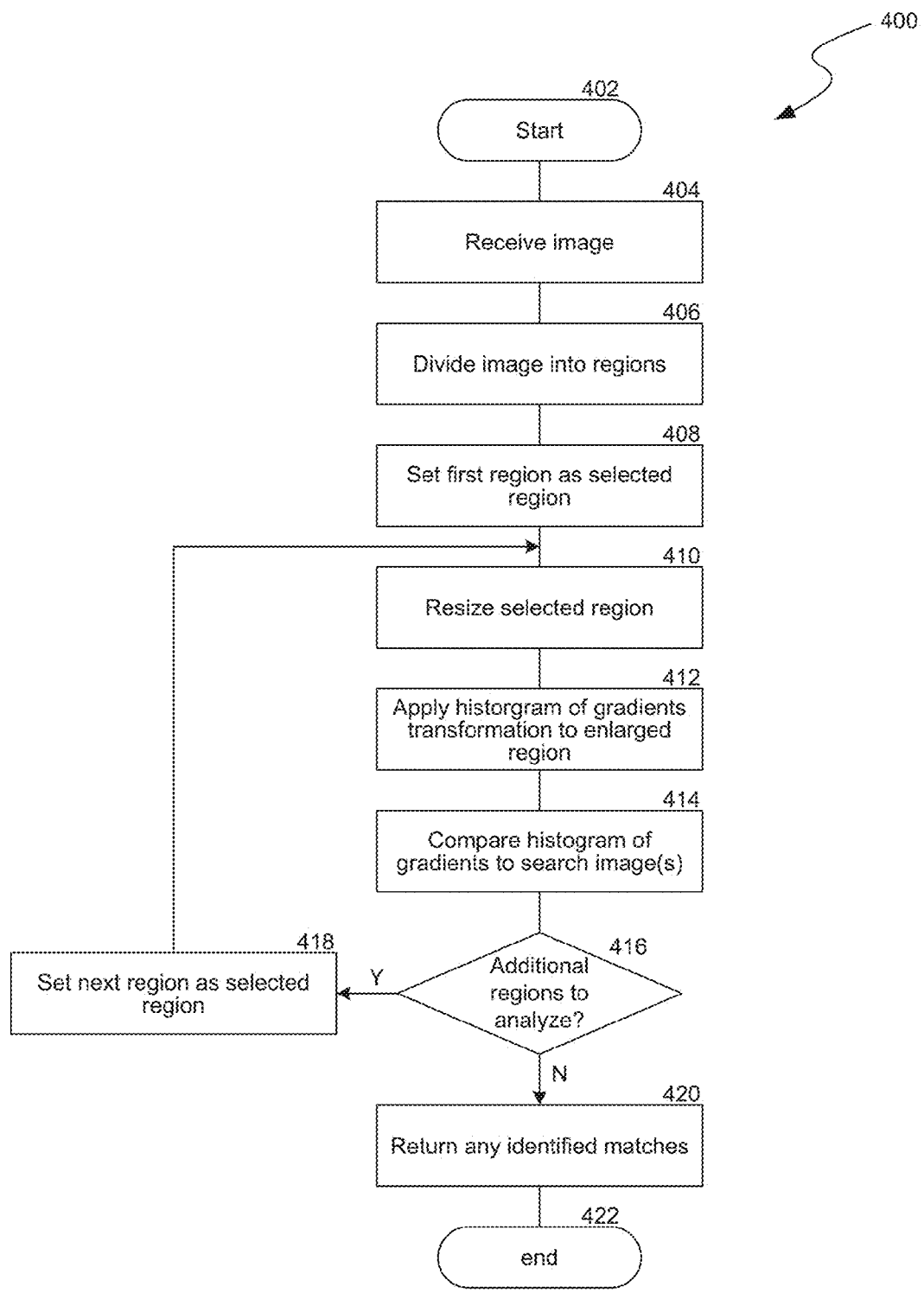
FIG. 4A is a flow diagram illustrating a process used in some implementations for searching for known images using region based histogram of gradients searching.

FIG. 4A is a flow diagram illustrating a process 400 used in some implementations for searching for known images using region based histogram of gradients searching. Process 400 begins at block 402 and continues to block 404 where an image is received. At block 406, the received image can be divided into a set of regions. In some implementations, the image can be divided into regions using a pre-established grid. In various implementations, the image can be divided into regions by establishing region boundaries based on changes in color, brightness, intensity, identified edges, or identified curves. In some implementations, regions can be established based on identified objects or text. In some implementations, regions can be established using a combination of the above techniques. For example, one region can be established using edge analysis while another region is established using object identification. In another example, one edge of a region can be established using curve analysis while another edge of that region can be established by identifying changes in intensity. In some implementations, identified regions can overlap. In some implementations, region identification can be based on characteristics of the search image, such as shape, size, color usage, border patterns, identified text, etc. For example, process 400 can identify that the search image has a red border, which can be used to identify regions based on changes from red to other colors.

At block 408, a first one of the regions from block 406 is set as a selected region. At block 410, the selected region can be resized. In some implementations, the resizing can include enlarging the selected region. In some implementations, the selected region can be enlarged to at least 80×80 pixels. In some implementations, the resizing can maintain the height and length ratios of the original selected region.

At block 412, process 400 can apply a histogram of gradients transformation to the resized selected region. As discussed above, applying a histogram of gradients transformation can include (1) computing a gradient analysis for the selected region, which can include applying a derivative mask in one or more directions and can employ filtering image colors or intensity data; (2) for each of multiple subsections of the selected region each pixel in that subsection can provide a weighted value for an orientation histogram channel based on the gradient computation for that pixel, where the value weights are based on the gradient magnitude; (3) locally normalizing gradient strengths by grouping the subsections together into connected blocks, which can be represented as a vector (in some implementations, these blocks may overlap, i.e. the same subsection can be included in multiple blocks); and (4) performing normalization across the blocks to obtain the histogram of gradients for the selected region.

At block 414, the histogram of gradients of the selected region can be compared to the one or more search images. In some implementations, this comparison can be accomplished by providing a representation of the histogram of gradients of the selected region to a classifier trained for the search image. Classifiers can be trained to identify the search image using a set of images labeled as either including or not including the search image. In some implementations, this training data can be obtained by obtaining a set of images, dividing the images into regions, enlarging the regions, applying a histogram of gradients transformation to the enlarged regions, and labeling, either manually or with an automated process, the portions that included the search image. For example, where the classifier is a neural network, weights of the connections within the network can be initially randomly set, and the transformed regions training data can be provided to the neural network. When the neural network provides an incorrect result, the weights of the edges can be adjusted to provide better classification results.

At block 416, process 400 determines whether there are additional regions in the set of regions created at block 406. If so, process 418 continues to block 418, and if not, process 400 continues to block 420. At block 418, the next region from block 406 is set as the selected region. Process 400 then iterates through blocks 410-418 until all of the regions from block 408 have been analyzed for including the search image. At block 420, an identification of any matches to the search images found at block 414 are returned. In some implementations, this identification can include a score indicating a closeness of the match of the received image to a search image. In some implementations, this identification can include a confidence factor for the match. Process 400 then continues to block 422, where it ends.

Figure 4B:
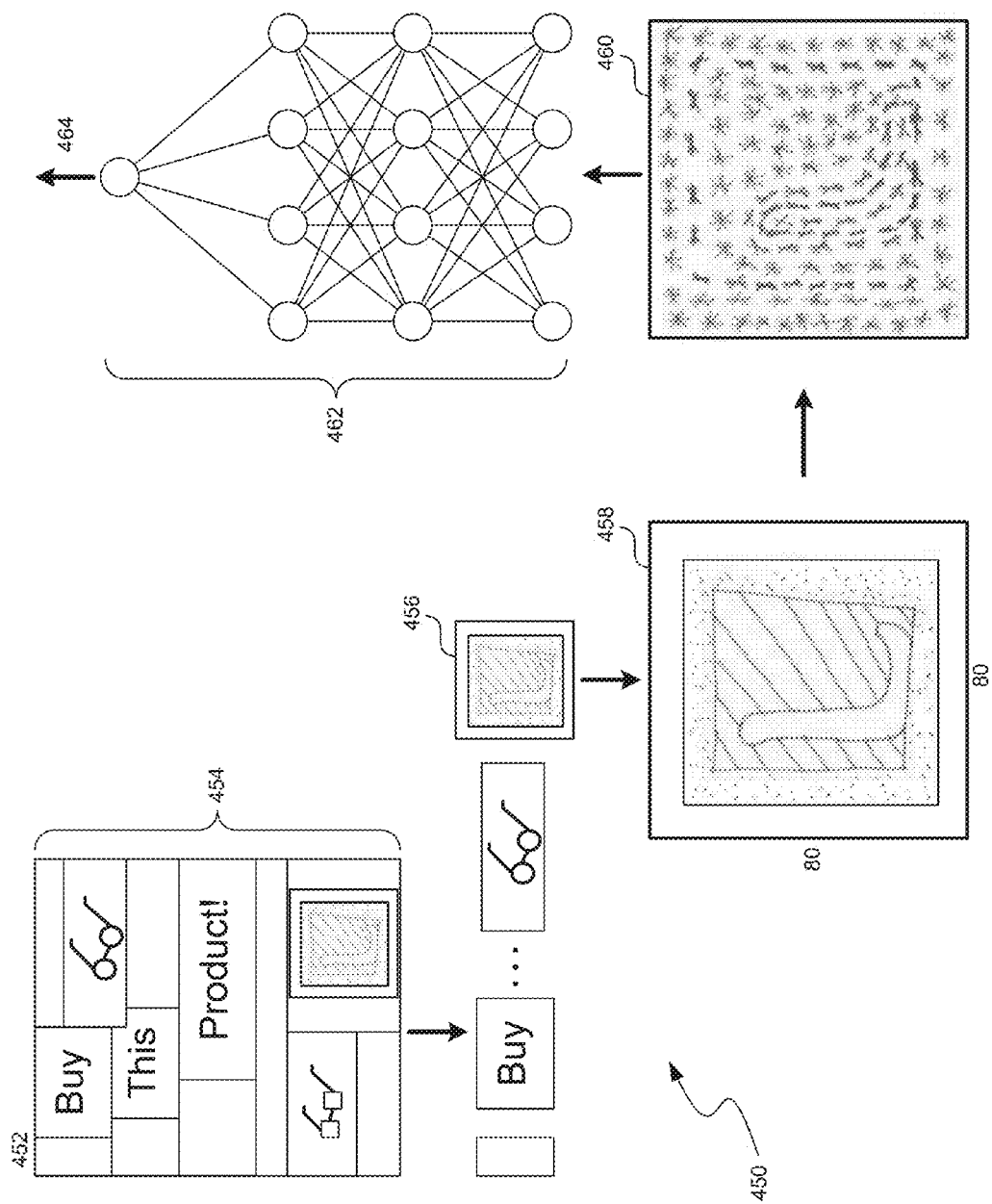
FIG. 4B is an example illustrating one implementation of the process described in FIG. 4A.

FIG. 4B is an example 450 illustrating one implementation of the process described in FIG. 4A. Example 400 begins by dividing image 452 into regions 454. In example 450, diving image 452 into regions is based on a determination of edges, object recognition, and text recognition. Three regions "Buy," "This," and "Product!" are identified based on text recognition, two regions are identified based on identification of sunglass objects, and region 456 is identified based on edge analysis. Other regions are also created around the identified regions.

Example 450 then continues by enlarging the regions. Region 456, is enlarged to 80×80 pixels as enlarged region 458. Enlarged region 458 is then transformed to a histogram of gradients version 460. A representation of histogram of gradients version 460 is then provided to classifier 462. Classifier 462 is trained to recognize histograms of gradients created that include a search image that is the logo shown in region 456. This training was performed using a set of images converted to histograms of gradients, some labeled as including the search image and some labeled as not including the search image. Classifier 462 provides output 464, which indicates that histogram of gradients version 460 was created from a region including the search image.

Figure 5A:
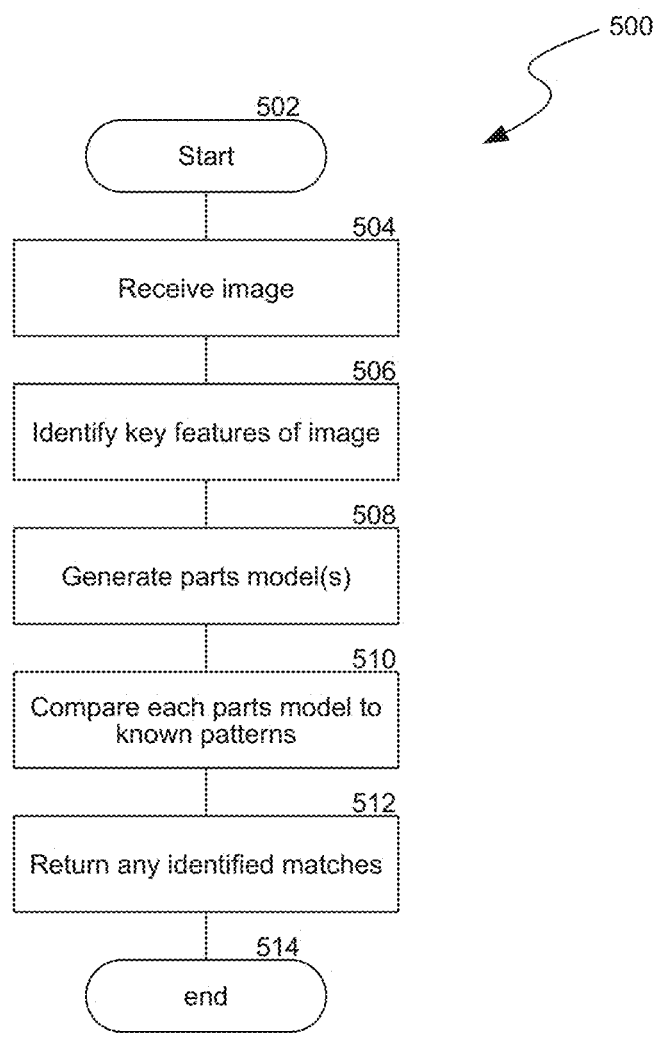
FIG. 5A is a flow diagram illustrating a process used in some implementations for searching for known images using parts model representations.

FIG. 5A is a flow diagram illustrating a process 500 used in some implementations for searching for known images using parts model representations. Process 500 begins at block 502 and continues to block 504 where an image is received. At block 506, key features of the image can be identified. In various implementations, key features can be identified using one or more of: curve identification, edge identification, corner identification, blob identification, contrast analysis, prominent areas, ridge identification, object identification, text identification, synthetic area identification, consecutive areas of similar colors, etc. In some implementations, identifying key features can be based on identified features of a search image. For example, where the search image includes a curve of a particular degree, only key features can be identified with curves within a degree within a threshold of the particular degree. As another example, where a search image includes particular text, key features can be identified where identified text in the received image has at least a threshold number of similar characters.

At block 508, at least one parts model can be generated using at least some of the key features identified at block 506. Parts models can be generated by representing the identified key features as one or more geometric shapes such as points, lines/curves, ovals, rectangles, triangles, etc. In some implementations, generating parts models includes connecting various of the key feature shapes. In some implementations, generating a parts model can be based on a best fit to a parts model of a search image. For example, a parts model of a search image may have four key features in a rectangular pattern, with each identified key feature represented as a point and connected in an X pattern. When creating parts models for received images, process 500 can identify key features best represented as points and connect ones that most closely match the X pattern of the search image. In some implementations, key features can be grouped according to characteristics such as locality, color, being in portions of the image with a similar contrast or intensity, matching the search parts model, etc. In some implementations, different key feature groupings can be created with overlapping sets of key features. These processes can, therefore, result in generating multiple parts models for the same received image.

At block 510, process 500 can compare the parts models generated at block 508 with a search image. In various implementations, multiple versions of the generated parts models can be compared to the search image, such as by creating multiple parts models by using different sizes, orientations, color transformations, warping/distortion procedures, etc. of the received image. In some implementations, the comparisons can be accomplished by providing a representation of the parts models to a classifier trained for the search image. Classifiers can be trained for the search image using a set of images labeled as either including or not including the search image. In some implementations, this training data can be obtained by obtaining a set of images, creating parts models for the images, and labeling, either manually or with an automated process, the parts modes corresponding to whether or not the key features that are included in that parts model make up the search image. For example, where the classifier is a neural network, weights of the connections within the network can be initially randomly set, and the training data parts models can be provided to the neural network. When the neural network provides an incorrect result, the weights of the edges can be adjusted to provide better classification results.

At block 522, an identification of the images with parts models found to match the search image are returned. In some implementations, this identification can include a score indicating a closeness of the match of the received image to a search images. In some implementations, this identification can include a confidence factor for the match. Process 500 then continues to block 514, where it ends.

Figure 5B:
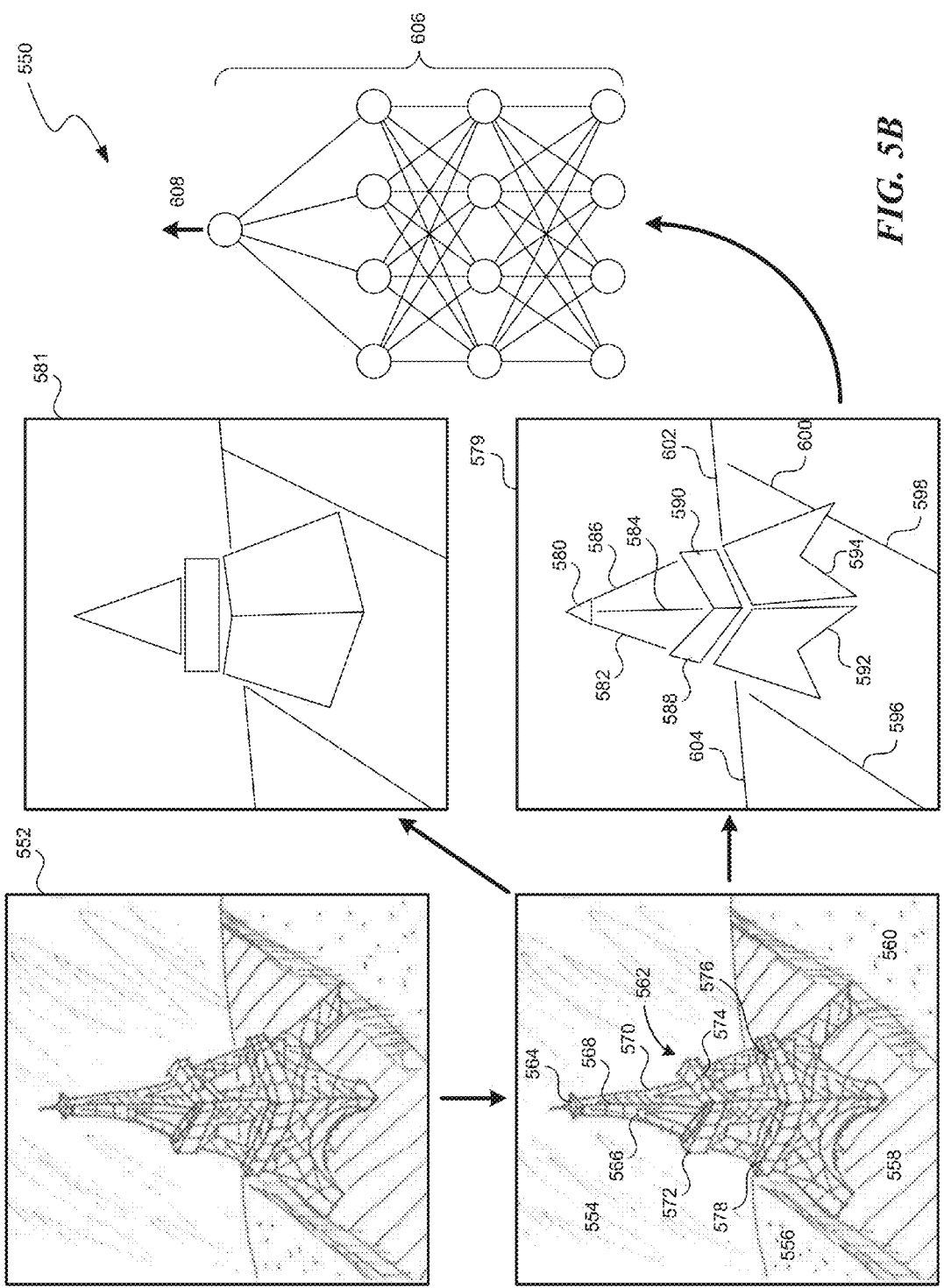
FIG. 5B is an example illustrating one implementation of the process described in FIG. 5A.

FIG. 5B is an example 550 illustrating one implementation of the process described in FIG. 5A. Example 550 begins with receiving image 552. Image 552 is then used to generate parts model 579. Generating parts model 579 occurs by determining key features of image 552. In this example, key feature identification is accomplished by line and curve identification as well as changes in brightness. In this example, first the portions of the image representing the Eiffel tower 562, the sky 554, the grass 556 and 560, and the walkway 558 are identified as key features using changes in brightness. Second, using line/curve identification, the Eiffel tower key feature is divided into further key features 564, 566, 568, 570, 572, 574, 576, and 578. Once key features are identified, parts model 579 is generated by replacing key features with geometric shapes and connecting some of the key features. For example, in parts model 579, key feature 564 is represented with triangle 580, key features 566, 568, and 570 are represented as lines 582, 584 and 586 respectively, and key features 572, 574, 576, and 578, are represented as polygons 588, 590, 594, and 592 respectively. In addition, key feature areas 554, 556, 558, and 560 are represented with line separators 596, 598, 600, 602, and 604. Also in example 550, another parts model algorithm is applied to generate parts model 581.

Example 550 then proceeds to provide each of the created parts models 579 and 581 to classifier 606. In this example, classifier 606 has been trained to recognize images containing the Eiffel tower using training data created by taking a large set of images, converting each to a parts model, and labeling each according to whether or not it includes the Eiffel tower. When parts model 579 is provided to classifier 606, output 608 is computed indicating that the image used to create parts model 579, i.e. image 552, includes a depiction of the Eiffel tower.

Several implementations of the disclosed technology are described above in reference to the figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links may be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C, etc.

Although the subject matter has been described in language specific to structural features or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above, are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

I claim:

1. A method for identifying a logo within an original image, comprising: receiving the original image that is to be searched for the logo; obtaining a first classifier trained using labeled representations of histograms of gradients to identify the logo; obtaining a second classifier trained using labeled parts models to identify the logo; analyzing whether the original image includes the logo by performing region analysis and parts model analysis, wherein the region analysis includes: dividing the original image into regions; and for each selected region of the regions: enlarging the selected region to a specified size; generating a histogram of gradients of the enlarged selected region, wherein generating the histogram of gradient comprises applying a derivative mask in one or more directions and filtering image colors or intensity data; and computing first classifier results indicating whether the selected region includes the logo, the computing first classifier results performed by providing a version of the generated histogram of gradients of the enlarged selected region as input to the obtained first classifier; and wherein the parts model analysis includes: identifying key features of the original image; generating a parts model of the original image by representing one or more of the identified key features as a point, line, or curve, and connecting at least a pair of the identified key features; and computing second classifier results indicating whether the original image includes the logo, the computing second classifier results performed by providing a version of the generated parts model as input to the obtained second classifier; determining, based on the first classifier results or the second classifier results, that the original image includes the logo; and providing, based on the determining, an indication that the original image includes the logo.

2. The method of claim 1, wherein dividing the original image into regions is based on an analysis of changes in intensity across areas of the original image.

3. The method of claim 1, wherein dividing the original image into regions is based on one or more of: identified synthetic portions of the original image, identified changes in color of the original image, identified changes in contrast of the original image, edge analysis in the original image, object recognition in the original image, text recognition in the original image, or any combination thereof.

4. The method of claim 1, wherein dividing the original image into regions is performed using an established region size.

5. The method of claim 1, wherein, for at least one region of the regions, one or more different additional histograms of gradients is generated for the at least one region by, prior to generating each of the one or more different additional histograms of gradients, rotating or warping the at least one region.

6. The method of claim 1, wherein the specified size is at least 80×80 pixels.

7. The method of claim 1, wherein identifying key features of the original image is performed by analyzing the original image for features appearing as part of the logo.

8. The method of claim 7, wherein analyzing the original image for features appearing as part of the logo includes locating one or more of: color changes identified in the logo, text identified in the logo, or objects identified in the logo.

9. The method of claim 1, wherein identifying key features of the original image is based on one or more of: identified changes in color, identified changes in contrast, edge analysis, blob recognition, object recognition, text recognition, or any combination thereof.

10. The method of claim 1, wherein, for at least one region of the regions, one or more different additional parts models are generated for the original image by, prior to generating each of the one or more different additional parts models, identifying different subsets of the key features or by rotating the original image.

11. A non-transitory computer-readable storage medium storing instructions that, when executed by a computing system, cause the computing system to perform operations for identifying a search image within an original image, the operations comprising:
receiving the original image that is to be searched for the search image;
obtaining a classifier trained using labeled representations of histograms of gradients to identify the search image;
obtaining a second classifier trained using labeled parts models to identify a logo;
analyzing whether the original image includes the logo by performing region analysis and parts model analysis, wherein the region analysis includes:
dividing the original image into regions based on an analysis of changes in intensity across areas of the original image;
for each selected region of the regions:
enlarging the selected region to a specified size;
generating a histogram of gradients of the enlarged selected region, wherein generating the histogram of gradient comprises applying a derivative mask in one or more directions and filtering color or intensity data; and
computing classifier results indicating whether the selected region includes the search image, the computing performed by providing a version of the generated histogram of gradients of the enlarged selected region as input to the obtained classifier; and
wherein the parts model analysis includes generating a parts model of the original image by representing one or more key features as a point, line, or curve, and connecting at least a pair of the key features;
determining, based on the computed classifier results, that at least one of the regions includes the search image; and
providing, based on the determining, an indication that the original image includes the search image.

12. The non-transitory computer-readable storage medium of claim 11, wherein boundaries of the regions are identified by the analysis of changes in intensity across areas of the original image.

13. The non-transitory computer-readable storage medium of claim 11, wherein dividing the original image into regions is based on one or more of: identified synthetic portions of the original image, identified changes in color of the original image, identified changes in contrast of the original image, edge analysis in the original image, object recognition in the original image, text recognition in the original image, or any combination thereof.

14. The non-transitory computer-readable storage medium of claim 11, wherein dividing the original image into regions is performed using an established region size.

15. The non-transitory computer-readable storage medium of claim 11, wherein, for at least one region of the regions, one or more different additional histograms of gradients is generated for the at least one region by, prior to generating each of the one or more different additional histograms of gradients, rotating or warping the at least one region.

16. The non-transitory computer-readable storage medium of claim 11, wherein the specified size is at least 80×80 pixels.

17. A system for identifying a search image within an original image, comprising:
a memory;
one or more processors;
a programmatic interface configured to:
receive the original image to be searched for the search image; and
receive a first classifier trained using labeled representations of histograms of gradients to identify the search image;
obtain a second classifier trained using labeled parts models to identify a logo;
analyze whether the original image includes the logo by performing region analysis and parts model analysis, wherein the region analysis includes:
dividing the original image into regions; and
for each selected region of the regions:
enlarging the selected region to a specified size;
generating a histogram of gradients of the enlarged selected region, wherein generating the histogram of gradient comprises applying a derivative mask in one or more directions and filtering color or intensity data; and
computing first classifier results indicating whether the selected region includes the logo, the computing first classifier results performed by providing a version of the generated histogram of gradients of the enlarged selected region as input to the obtained first classifier; and
a parts model generation module configured to:
identify key features of the original image; and
generate a parts model of the original image by representing one or more of the identified key features as a point, line, or curve, and connecting at least a pair of the identified key features; and
a parts model comparison module configured to:
compute second classifier results indicating whether the original image includes the search image, the computing performed by providing a version of the generated parts model as input to the obtained classifier;
determine, based on the first classifier results or the second classifier results, whether the original image includes the search image; and
provide, based on the determining, an indication whether the original image includes the search image.

18. The system of claim 17,
wherein identifying key features of the original image is performed by analyzing the original image for features appearing as part of the logo; and
wherein analyzing the original image for features appearing as part of the logo includes locating one or more of: color changes identified in the logo, text identified in the logo, or objects identified in the logo.

19. The system of claim 17, wherein identifying key features of the original image is based on one or more of: identified changes in color, identified changes in contrast, edge analysis, blob recognition, object recognition, text recognition, or any combination thereof.

20. The system of claim 17, wherein, for at least one region of the original image, one or more different additional parts models are generated for the original image by, prior to generating each of the one or more different additional parts models, identifying different subsets of the key features or by rotating the original image.

21. The method of claim 1, further comprising:
identifying an overlap of a first region and a second region, the first region being defined by an identified object and the second region being defined by identified color intensity variation.

22. The method of claim 1, wherein generating a histogram of gradients of the enlarged selected region further comprises:
for each of multiple subsections of the region, determining a weighted value for an orientation histogram channel based on the gradient computation for each pixel in each of multiple subsections, wherein the weighted value is based on the gradient magnitude;
locally normalizing gradient strengths by grouping a subset of the multiple subsections together into connected blocks represented as a vector; and
performing normalization across the blocks.

* * * * *